United States Patent
Cao et al.

(10) Patent No.: US 11,212,705 B2
(45) Date of Patent: Dec. 28, 2021

(54) EXTRA HIGH THROUGHPUT PREAMBLE

(71) Applicant: NXP USA, Inc., Austin, TX (US)

(72) Inventors: Rui Cao, Sunnyvale, CA (US);
Hongyuan Zhang, Fremont, CA (US);
Liwen Chu, San Ramon, CA (US);
Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/882,366

(22) Filed: May 22, 2020

(65) Prior Publication Data

US 2020/0382998 A1    Dec. 3, 2020

Related U.S. Application Data

(60) Provisional application No. 62/853,630, filed on May 28, 2019, provisional application No. 62/859,551, filed on Jun. 10, 2019, provisional application No. 62/886,819, filed on Aug. 14, 2019.

(51) Int. Cl.
*H04W 28/06* (2009.01)
*H04L 1/00* (2006.01)
*H04L 27/18* (2006.01)
*H04W 84/12* (2009.01)

(52) U.S. Cl.
CPC .......... *H04W 28/065* (2013.01); *H04L 1/004* (2013.01); *H04L 27/18* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,131,528 B2 | 9/2015 | Zhang et al. | |
| 10,135,572 B2 | 11/2018 | Zhang et al. | |
| 2019/0097850 A1* | 3/2019 | Kenney | H04L 1/0061 |
| 2020/0029333 A1 | 1/2020 | Zhang et al. | |
| 2020/0127681 A1* | 4/2020 | Verma | H03M 13/09 |
| 2021/0014788 A1* | 1/2021 | Sahin | H04W 52/0216 |

OTHER PUBLICATIONS

IEEE, "Part 11: Wireless LAN Medium Access Control (MAC) and Physical Layer (PHY) Specifications," P802.11-REVmdTM/D3.0, Oct. 2019, 4647 pages.

IEEE, "Part 11: Wireless LAN Medium Access Control (MAC) and Physical Layer (PHY) Specifications, Amendment 1: Enhancements for High Efficiency WLAN," P802.11ax™ /D6.0, Nov. 2019, 780 pages.

* cited by examiner

Primary Examiner — Diane L Lo

(57) ABSTRACT

Techniques for signaling new versions of a communication protocol differentiated from legacy versions of the communication protocol that are interoperable with stations implementing legacy versions of the communication protocol, that are compatible with future new versions of the communication protocol, and that do not overly complicate the receiver state machine have been disclosed.

20 Claims, 9 Drawing Sheets

EXTRA HIGH THROUGHPUT PREAMBLE

CROSS-REFERENCE TO RELATED APPLICATION(S)

This application claims benefit of U.S. provisional application No. 62/853,630, entitled "EXTRA HIGH THROUGHPUT (EHT) PREAMBLE DESIGN," naming Rui Cao, Hongyuan Zhang, and Liwen Chu as inventors, filed May 28, 2019, and U.S. provisional application No. 62/859,551, entitled "EXTRA HIGH THROUGHPUT (EHT) PREAMBLE DESIGN," naming Rui Cao, Hongyuan Zhang, Liwen Chu, and Sudhir Srinivasa as inventors, filed Jun. 10, 2019 and U.S. provisional application No. 62/886,819, entitled "EXTRA HIGH THROUGHPUT (EHT) PREAMBLE DESIGN," naming Rui Cao, Hongyuan Zhang, Liwen Chu, and Sudhir Srinivasa as inventors, filed Aug. 14, 2019, which applications are incorporated herein by reference in their entirety.

BACKGROUND

Field of the Invention

This disclosure relates to communications networks, and more particularly, to protocols for operating communications networks.

Description of the Related Art

In general, a communication protocol provides a set of rules that allow two or more entities of a communications network to communicate information via a variation of a physical quantity. An exemplary communication protocol defines rules, syntax, semantics, and synchronization of communications. Technical standards formalize uniform specifications for a communication protocol to enable interoperability of products made by different manufacturers. For example, the Institute of Electrical and Electronics Engineers (IEEE) is a professional organization that develops global standards in various industries, including telecommunications and consumer electronics. Exemplary communication protocol standards include the IEEE 802 standards for Local Area Networks (LAN) and Metropolitan Area Networks (MAN). The IEEE 802.11 standard sets protocols for Wireless Local Area Networking (WLAN) of computer communications. A typical protocol standard includes an original version of the protocol standard followed by amended versions of the protocol standard that make technical improvements and corrections to the original version or intervening versions of the standard. To guarantee interoperability between two or more entities of the communications network, techniques that identify the communication protocol and version of the communication protocol being used by the entities are desired.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

The use of the same reference symbols in different drawings indicates similar or identical items.

DETAILED DESCRIPTION

In embodiments of a communication network described below, a wireless network device such as an access point of a wireless local area network (WLAN) transmits data streams to at least one client station. The access point is configured to operate with client stations according to at least a first communication protocol. The first communication protocol is sometimes referred to herein as an Extra High Throughput (EHT) communication protocol, or IEEE 802.11be communication protocol. In at least one embodiment of a communication network described below, at least one client station transmits a corresponding data stream to an access point. In at least one embodiment of the communication network, different client stations in the vicinity of the access point are configured to operate according to at least one other communication protocol which defines operation in the same frequency band as the EHT communication protocol but with generally lower data throughputs. The lower data throughput communication protocols (e.g., IEEE 802.11a, IEEE 802.11n, IEEE 802.11ac, or IEEE 802.11ax communication protocols) are collectively referred herein as "legacy" communication protocols and communications protocols after IEEE 802.11ax are referred to herein as "future versions" that include at least one "new" or "newer" communication protocol.

Figure 1:
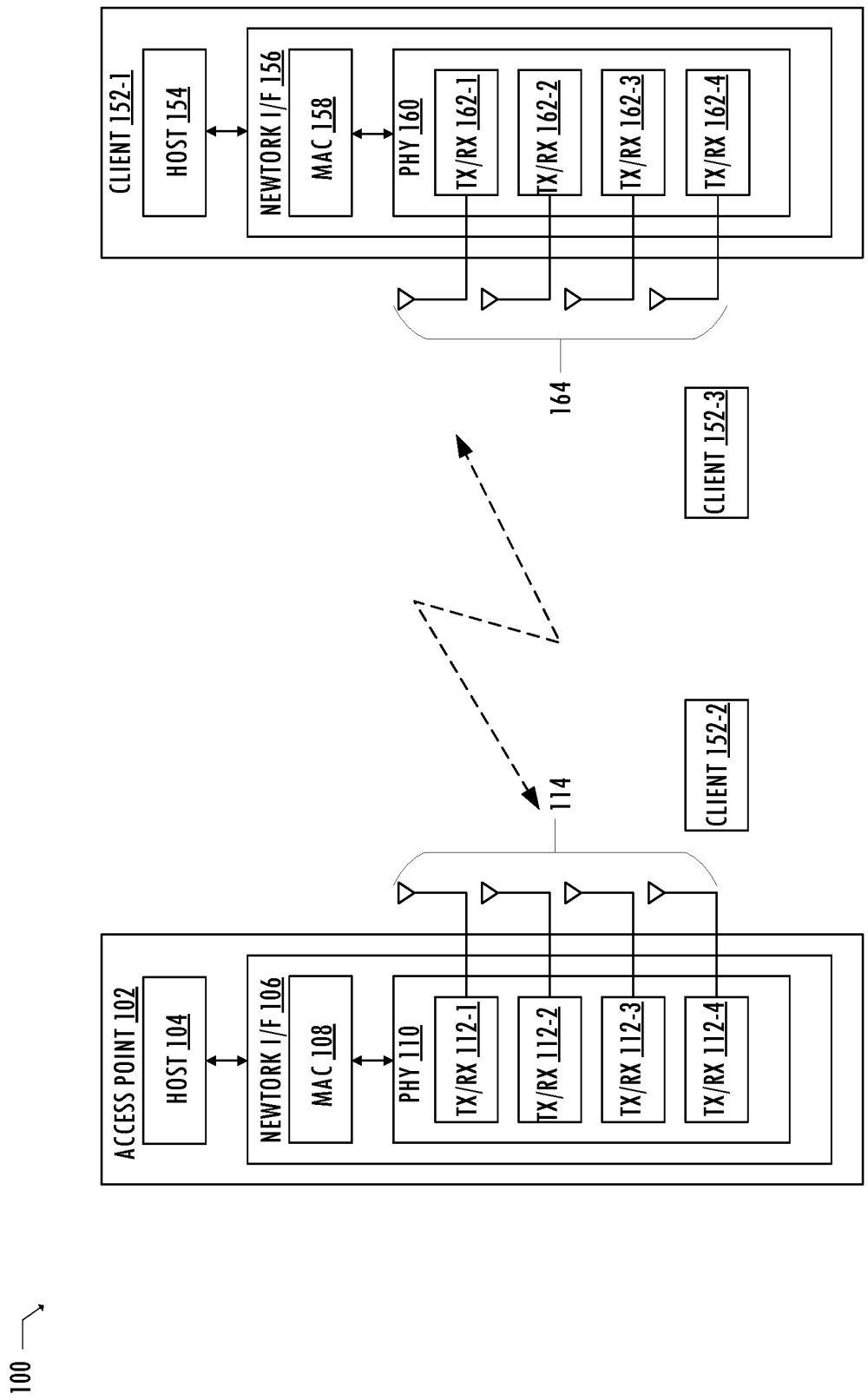
FIG. 1 illustrates a functional block diagram of an exemplary wireless communications network.

Referring to FIG. 1, WLAN 100 includes access point 102 and client stations 152-1, 152-2, and 152-3. Although FIG. 1 illustrates three client stations, other numbers of client stations may be used. Access point 102 includes host processor 104 coupled to network interface 106. Host processor 104 includes a processor configured to execute machine readable instructions stored in a memory device (not shown), e.g., random access memory (RAM), read-only memory (ROM), a flash memory, or other storage device. Network interface 106 includes medium access control (MAC) processor 108, which, in at least one embodiment, is part of a data link layer of an IEEE 802.11 standard-compliant access point, and physical layer (PHY) processor 110. In general, the PHY is the first and lowest layer of the seven-layer Open Systems Interconnection (OSI) model of computer networking and includes electronic circuit transmission technologies of the network. In at least one embodiment, MAC processor 108 or PHY processor 110 are configured to generate data units for wireless transmission and are configured to process received data units that conform to a communications protocol compliant with the IEEE 802.11 standard. For example, MAC processor 108 is configured to implement MAC layer functions, including MAC layer functions of the WLAN communications protocol and PHY processor 110 is configured to implement PHY protocol data units (PPDUs), MAC protocol data units (MPDUs), etc., and provides MAC layer data units to PHY processor 110. PHY processor 110 is configured to receive MAC layer data units from MAC processor 108 and to encapsulate those MAC layer data units to generate PPDUs (i.e., data units) for transmission via antennas 114. PHY processor 110 provides the extracted MAC layer data units to MAC processor 108 for further processing.

In at least one embodiment, PHY processor 110 includes a plurality of transceivers 112-1, 112-2, 112-3, and 112-4, each of which is coupled to a corresponding antenna of antennas 114. Although four antennas and four transceivers are illustrated, other numbers of antennas and transceivers are used in other embodiments of a communications system. Each of transceivers 112-1, 112-2, 112-3, and 112-4 includes a transmitter signal path and a receiver signal path, e.g., mixed-signal circuits, analog circuits, and digital signal processing circuits for implementing radio frequency and digital baseband functionality. PHY processor 110 includes at least one amplifier (e.g., low noise amplifier or power amplifier), data converter, and circuits that perform discrete Fourier transform (DFT), inverse discrete Fourier transform (IDFT), modulation, and demodulation. Access point 102 or client stations 152-1, 152-2, or 152-3 generate and transmit data units that include training fields (e.g., data having predetermined values or characteristics) that are used by a receiver signal path to perform synchronization, perform gain control, and estimate channel characteristics for signal equalization. Client stations 152-1, 152-2, and 152-3 each include similar circuits (e.g., host processor 154, network interface 156, MAC processor 158, PHY processor 160, transceivers 162-1, 162-2, 162-3, and 162-4, and antennas 164) that provide similar functionality to that of access point 102 but are adapted to client-side specifications.

Figure 2:
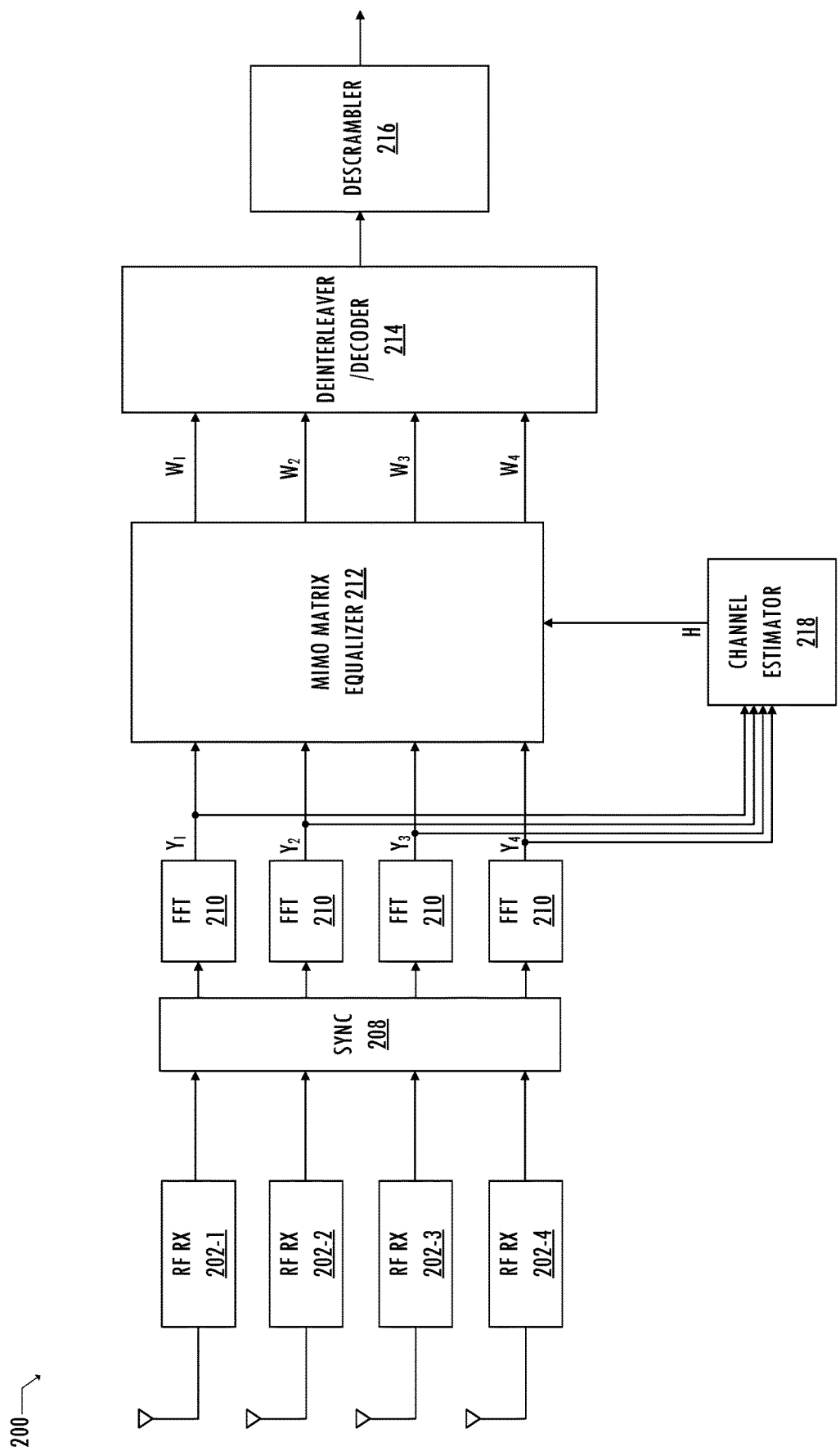
FIG. 2 illustrates a functional block diagram of a portion of an exemplary receiver of the wireless communications network of FIG. 1.

Referring to FIG. 2, in at least one embodiment of a transceiver, multiple-input and multiple-output (MIMO) orthogonal frequency division multiplexing (OFDM) receiver path 200 includes radio-frequency (RF) receiver interfaces 202-1, 202-2, 202-3, and 202-4 coupled to corresponding antennas and synchronization circuit 208, which synchronizes the received signals. Fast Fourier Transform (FFT) processor 210 demodulates a data portion of each received packet by transforming it from a time domain representation to a frequency domain symbol $Y_1$, $Y_2$, $Y_3$, and $Y_4$, and provides the frequency domain symbols to MIMO matrix equalizer (MIMO MEQ) 212, which applies inverse channel matrices to received symbols to compensate for effects of the channel. After MIMO matrix equalization, deinterleaver/decoder 214 recovers scrambled data streams, which are descrambled by descrambler 216. Channel estimator 218 generates an $M \times N_{SS}$ channel matrix for each subcarrier of an OFDM signal based on training signals received by MIMO OFDM receiver 200. Each $M \times N_{SS}$ channel matrix is used by MIMO MEQ 212 to generate an inverse channel matrix for the corresponding subcarrier. MIMO MEQ 212 applies coefficients of the inverse channel matrices to received symbols $Y_1$, $Y_2$, $Y_3$, and $Y_4$. Deinterleaver/decoder 214 deinterleaves and decodes equalized signals $W_1$, $W_2$, $W_3$, and $W_4$, and descrambler 216 provides descrambled signals to other portions of the transceiver or network interface.

Figure 3:
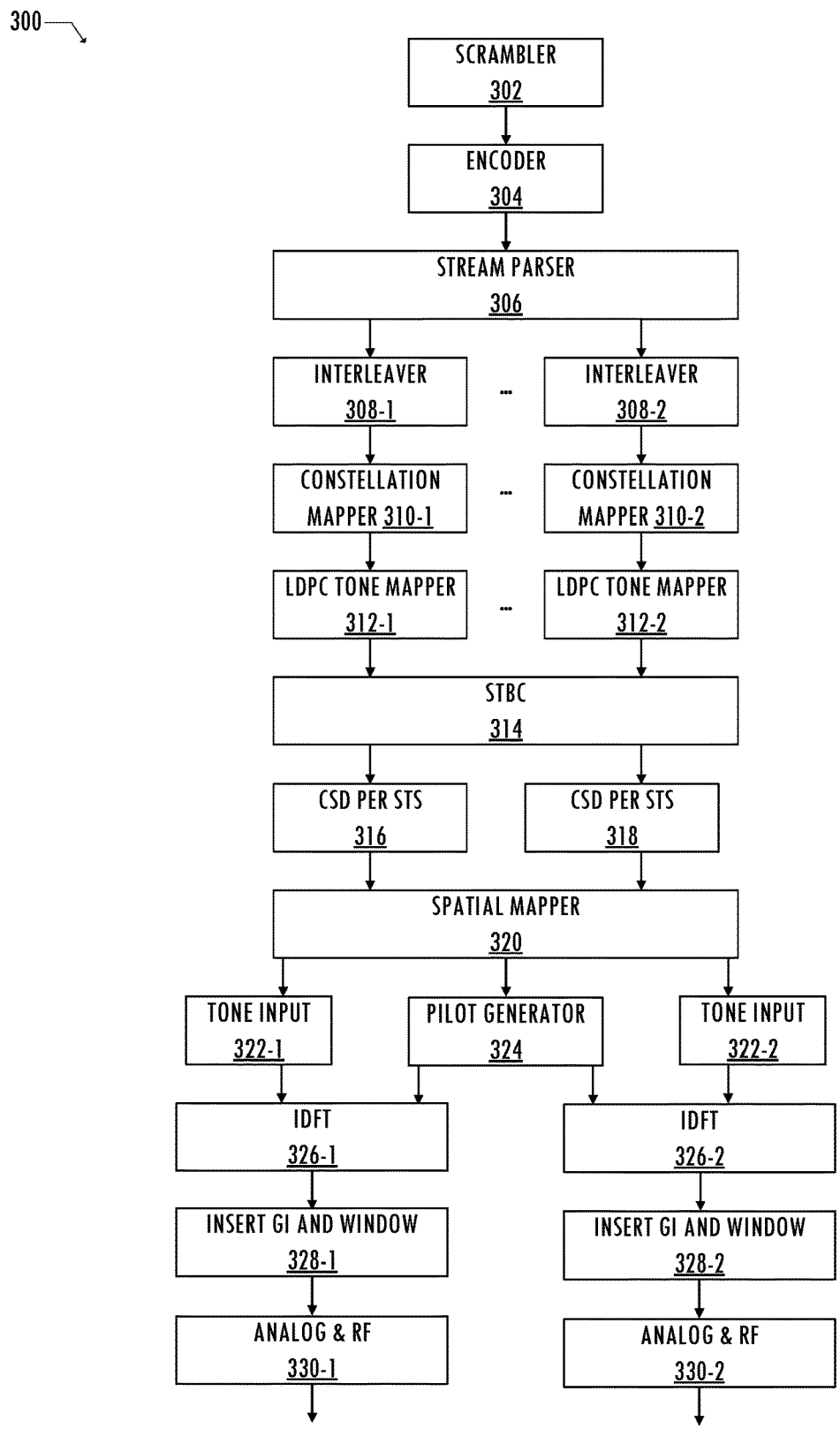
FIG. 3 illustrates a functional block diagram of a portion of an exemplary transmitter of the wireless communications network of FIG. 1.

Referring to FIGS. 1 and 3, access point 102 and client 152-1, each include a corresponding transmitter path 300. In at least one embodiment, transmitter path 300 generates OFDM data units for transmission. Transmitter path 300 includes scrambler 302 that generally scrambles an information bit stream to be transmitted in order to reduce the occurrence of long sequences of ones or zeros. Encoder 304 (e.g., a forward error correction encoder) encodes scrambled information bits to generate encoded data bits. In at least one embodiment, encoder 304 includes a binary convolutional code (BCC) encoder. In another embodiment, encoder 304 includes a binary convolutional encoder followed by a puncturing block. In yet another embodiment, encoder 304 includes a low density parity check (LDPC) encoder.

In at least one embodiment of transmitter path 300, stream parser 306 receives and parses the encoded data bits into one or more spatial streams. For each spatial stream (e.g., two spatial streams as illustrated in FIG. 3), constellation mappers 310-1 and 310-2 map the encoded data bits to constellation points corresponding to different subcarriers of an OFDM symbol. More specifically, for each spatial stream, constellation mappers 310-1 and 310-2 translate every bit sequence of length $\log_2(M)$ into one of M constellation points. In at least one embodiment, transmitter path 300 includes a plurality of parallel processing paths, for example, one path for each spatial stream. In other embodiments, transmitter path 300 includes a single processing path for all of the spatial streams.

In at least one embodiment of transmitter path 300, encoder 304 is a BCC encoder and interleavers 308-1 and 308-2 receive the encoded data bits and interleave the bits (i.e., change the order of the bits), prior to constellation mappers 310, to prevent long sequences of adjacent noisy bits from entering a decoder at the receiver. In at least one embodiment, transmitter path 300 omits interleavers 308-1 and 308-2. In at least one embodiment of transmitter path 300, encoder 304 is a low-density parity-check (LDPC) encoder and LDPC tone mappers 312-1 and 312-2 reorder constellation points according to a tone remapping function. In general, the tone remapping function maps consecutive coded information bits or blocks of information bits are mapped onto nonconsecutive tones in an OFDM symbol to facilitate data recovery at the receiver in cases in which consecutive OFDM tones are adversely affected during transmission. In at least one embodiment, transmitter path 300 omits LDPC tone mappers 312-1 and 312-2.

In at least one embodiment of transmitter path 300, space time block coder (STBC) 314 operates on the outputs of constellation mappers 310 for each stream (or on outputs of LDPC tone mappers 312-1 and 312-2, where included). In at least one embodiment of transmitter path 300, space-time block coder 314 maps a single constellation symbol output onto multiple transmission chains for transmission by separate radio transmitters, transforming the spatial streams into space-time streams. In embodiments or situations in which transmitter path 300 operates to generate data units for transmission via multiple spatial streams, one or more cyclic shift diversity (CSD) units 316 and 318 insert a cyclic shift into all but one of the spatial streams to prevent unintentional beamforming. In at least one embodiment of transmitter path 300, spatial mapper 320 maps the space-time streams onto a transmission chain. Transmitter path 300 includes inverse discrete Fourier transform (IDFT) processors 326-1 and 326-2 for corresponding transmission chains. In at least one embodiment of transmitter path 300, encoder 304, stream parser 306, interleavers 308-1 and 308-2, constellation mappers 310-1 and 310-2, LDPC tone mappers 312-1 and 312-2, STBC 314, CSD units 316 and 318, and spatial mapper 320 operate according to the IEEE 802.11be communications protocol.

In at least one embodiment of transmitter path 300, IDFT processors 326-1 and 326-2 receive pilot tones from pilot generator 324 and spatially mapped constellation points from spatial mapper 320. In at least one embodiment of transmitter path 300, IDFT processor 326 converts a block of the spatially mapped constellation points corresponding to data tones within an OFDM tone block and pilot tones to a time-domain signal. In at least one embodiment, IDFT processor 326 processes one or more tones from tone input 322 to be included in the time-domain signal. For example, transmitter path 300 generates an orthogonal frequency division multiple access (OFDMA) data unit having OFDM data units for multiple users to be transmitted from an access point (i.e., a downstream OFDMA data unit). In such embodiments, tone input 322 provides data tones and/or pilot tones corresponding to another user which are generated separately. Thus, IDFT processor 326 performs the IDFT jointly for all tones for all users simultaneously.

In at least one embodiment of WLAN 100, transmitter path 300 generates a portion of an OFDMA data unit to be transmitted from a client station to an access point (i.e., a portion of an uplink OFDMA data unit). In at least one embodiment of transmitter path 300, tone inputs 322-1 and 322-2 provide zero tones for unassigned OFDM tone blocks for generation of the OFDMA data unit using a full-size FFT. In at least one embodiment of WLAN 100, the client station generates and transmits an OFDMA data unit portion that spans only the OFDM tone block assigned to the client station using a suitable FFT size.

Figure 4:
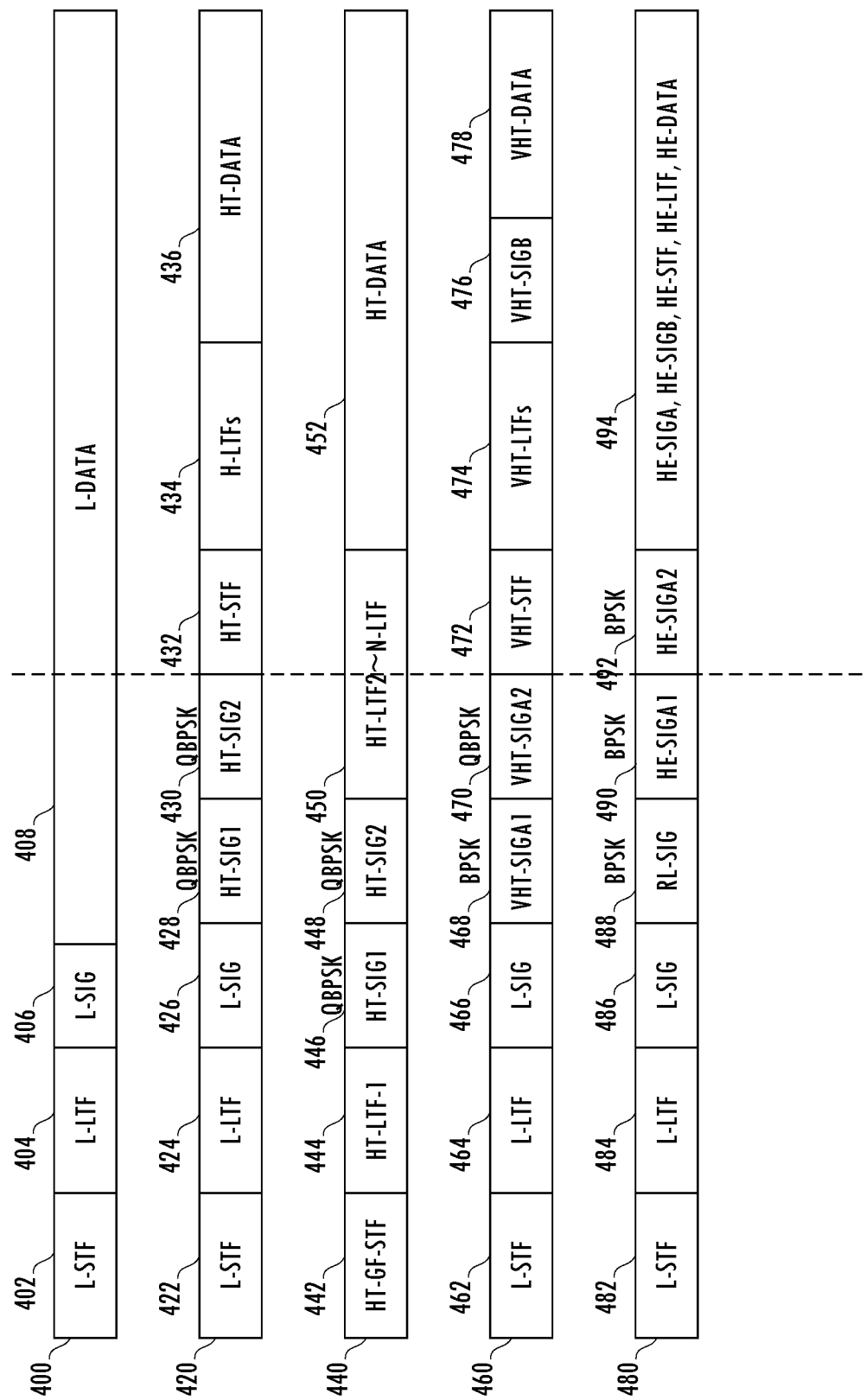
FIG. 4 illustrates of prior art data unit formats of an exemplary communication protocol.

Referring to FIGS. 1 and 4, in at least one embodiment, WLAN 100 is configured to use legacy data unit formats 400, 420, 440, 460, or 480 to communicate between an access point and a client station. Data unit format 400 conforms to the IEEE 802.11a standard and occupies a 20 Mega-Hertz (MHz) frequency band. Data unit format 400 includes a preamble having legacy short training field (L-STF) 402, generally used for packet detection, initial synchronization, and automatic gain control, etc., and legacy long training field (L-LTF) 404, generally used for channel estimation and fine synchronization. Data unit format 400 also includes legacy signal field (L-SIG) 406, used to communicate certain PHY parameters of data unit format 400, e.g., modulation type and coding rate used to transmit the data unit. Data unit format 400 also includes data portion 408. In at least one embodiment, data unit format 400 includes data portion 408 that is not low density parity check encoded, and includes a service field, a scrambled physical layer service data unit (PSDU), tail bits, and padding bits, if needed. Data unit format 400 is designed for transmission over one spatial or space-time stream in a single-input single-output (SISO) channel configuration.

In at least one embodiment of WLAN 100, at least one of access point 102 and client station 152-1 is configured to communicate data units using data unit format 420, a legacy data unit format. Data unit format 420 conforms to the IEEE 802.11n standard, occupies a 20 MHz frequency band, and is designed for mixed mode situations, i.e., when the WLAN includes one or more client stations that conform to the IEEE 802.11a standard but not the IEEE 802.11n standard. Data unit format 420 includes a preamble having L-STF 422, L-LTF 424, L-SIG 426, high throughput signal fields HT-SIG1 428 and HT-SIG2 430, high throughput short training field (HT-STF) 432, and M high throughput long training fields (HT-LTFs) 424, where M is an integer generally determined based on the number of spatial streams used to transmit data unit 420 in a multiple-input multiple-output (MIMO) configuration. In particular, according to the IEEE 802.11n standard, data unit format 420 includes two HT-LTFs 434 if the data unit is transmitted using two spatial streams, and four HT-LTFs 434 if the data unit is transmitted using three or four spatial streams. An HT-SIG field indicates the number of spatial streams being utilized. Data unit format 420 also includes a data portion, HT-DATA 336.

In at least one embodiment of WLAN 100, at least one of access point 102 and client station 152-1 is configured to communicate data units using data unit format 440, a legacy data unit format. Data unit format 440 conforms to the IEEE 802.11n standard, occupies a 20 MHz frequency band, and is designed for "Greenfield" situations, i.e., when the WLAN does not include any client stations that conform to the IEEE 802.11a standard and only includes client stations that conform to the IEEE 802.11n standard. Data unit format 440 includes a preamble having high throughput Greenfield short training field (HT-GF-STF) 442, first high throughput long training field (HT-LTF1) 444, HT-SIGs (e.g., HT-SIG1 446 and HT-SIG2 448), and MHT-LTFs 450, where M is an integer which generally corresponds to a number of spatial streams used to transmit a data unit in a MIMO channel configuration. Data unit format 440 also includes data portion, HT-DATA 452.

In at least one embodiment of WLAN 100, at least one of access point 102 and client station 152-1 is configured to communicate data units using data unit format 460, a legacy data unit format. Data unit format 460 conforms to the IEEE 802.11ac standard and is designed for "mixed field" situations. Data unit format 460 occupies a 20 MHz bandwidth. In other embodiments or scenarios, a data unit format similar to data unit format 460 occupies a different bandwidth, such as a 40 MHz, an 80 MHz, or a 160 MHz bandwidth. Data unit format 460 includes a preamble having L-STF 462, L-LTF 464, L-SIG 466, two first very high throughput signal fields (VHT-SIGAs) including first very high throughput signal field (VHT-SIGA1) 468 and second very high throughput signal field (VHT-SIGA2) 470, very high throughput short training field (VHT-STF) 472, M very high throughput long training fields (VHT-LTFs) 474, where M is an integer, and second very high throughput signal field (VHT-SIG-B) 476. Data unit 460 also includes a data portion, VHT-DATA 478.

In at least one embodiment of WLAN 100, at least one of access point 102 and client station 152-1 is configured to communicate data units using data unit format 480, a legacy data unit format. Data unit format 480 conforms to the IEEE 802.11ax standard. Data unit format 480 occupies a 20 MHz bandwidth. In other embodiments or scenarios, a data unit similar to a data unit having data unit format 480 occupies a different bandwidth, such as a 40 MHz, an 80 MHz, or a 160 MHz bandwidth. Data unit format 480 includes a preamble having L-STF 482, L-LTF 484, L-SIG 486, RL-SIG 488, two first very high efficiency signal fields (HE-SIGA1 490 and HE-SIGA2 492) and data portion 494.

Figure 5:
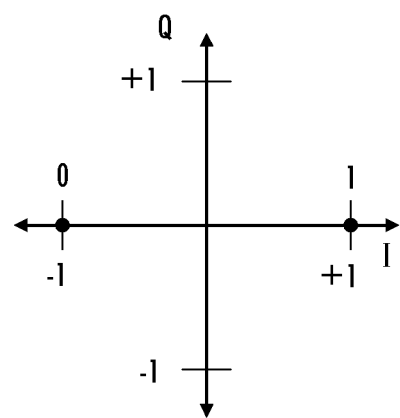
FIG. 5 illustrates a diagram of binary phase-shift keying modulation for bits of a signal field of a data unit.
Figure 6:
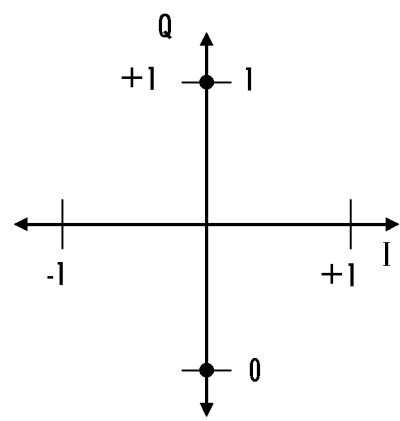
FIG. 6 illustrates a diagram of a quadrature binary phase-shift keying modulation for bits of a signal field of a data unit.

FIGS. 5 and 6 illustrate modulation schemes used for various fields of legacy data unit formats of FIG. 4, as defined by the corresponding IEEE 802.11 standards. In general, the L-SIG fields are modulated according to binary phase-shift keying (BPSK), whereas the HT-SIG1 and HT-SIG2 fields are modulated according to BPSK, but on the quadrature axis (Q-BPSK). In other words, the modulation of the HT-SIG1 and HT-SIG2 fields is rotated by 90 degrees as compared to the modulation of the L-SIG field.

The EHT communication protocol (i.e., IEEE 802.11be standard) is a next version of the communications protocol that succeeds the IEEE High Efficiency (HE) 802.11ax standard. Additional next versions of the IEEE 802.11 communication protocol can succeed IEEE 802.11ax or IEEE 802.11be. Those next versions for the communication protocol must provide backward compatibility and support coexistence with legacy versions of the IEEE 802.11 communication protocol. Therefore, the preamble of a data unit compliant with the IEEE 802.11be communication protocol distinguishes the data unit as being a preamble of an EHT data unit and must be distinguishable from the format of data units of legacy communication protocols for proper autodetection. Referring to FIG. 4, legacy data unit formats 400, 420, 440, 460, and 480 implicitly signal the version of the data unit format by embedding the version information in a value of the L-SIG LENGTH, a repetition of L-SIG, rotated BPSK modulation of multiple symbols of the preamble of the data unit, or combination thereof.

However, detection of implicitly encoded version information complicates auto-detection by the receiver path and provides limited options for identifying new versions of the communication protocol. For example, a receiver path determines that a received data unit complies with the IEEE 802.11n-MM communication protocol by determining whether the length encoded in the L-SIG field modulo three equals zero and whether HT-SIG1 and HT-SIG2 fields are modulated using QBPSK. If the third field of the preamble is modulated using QBPSK, then the receiver path determines that the received data unit has an IEEE 802.11n-GF communication protocol. If the received data unit includes a preamble having a length encoded in an L-SIG field modulo three that equals zero, a fourth field (e.g., VHT-SIGA1 field) modulated using BPSK, and a fifth field (e.g., VHT-SIGA2 field) modulated using QBPSK, then the receiver identifies the received data unit as being compliant with the IEEE 802.11ac communication protocol. If the received data unit includes a preamble that has a third field (e.g., L-SIG field) with a length modulo three that does not equal zero, a fourth field (e.g., RL-SIG field) that is modulated using BPSK, a fifth field (e.g., HE-SIGA1 field) that is modulated using BPSK, and a sixth field (E.g., HE-SIGA2) that is modulated using BPSK, then the receiver identifies the received data unit as being compliant with the IEEE 802.11ax communication protocol. Otherwise, the receiver identifies the received data unit as being formatted compliant with an IEEE 802.11a communication protocol. In general, auto-detection uses three fields (i.e., symbols) of the preamble of the data unit and the state machine complexity increases by adding a new signature for each new data unit format corresponding to a new version of the communication protocol, which can increase latency and impact performance.

Figure 7:
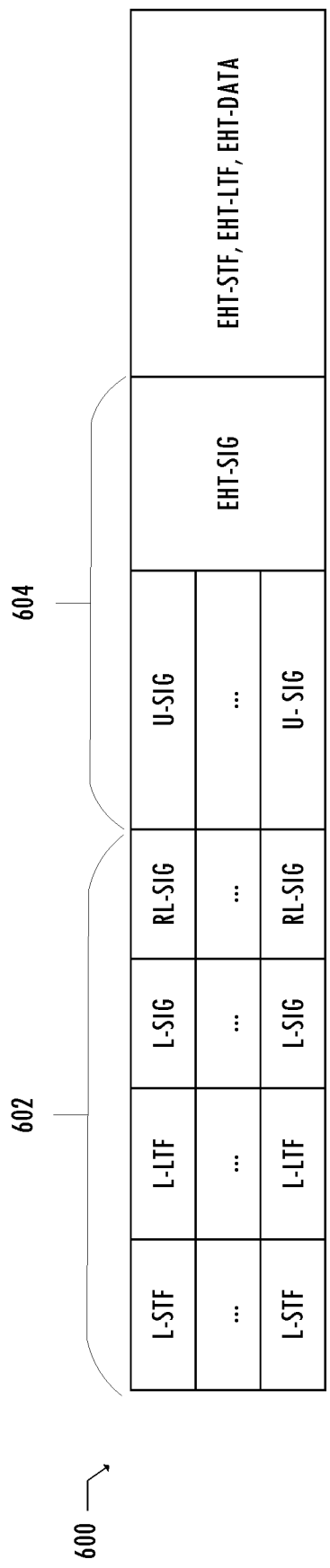
FIG. 7 illustrates a diagram of an exemplary data unit format of a new version of the communication protocol of FIG. 4, consistent with at least one embodiment of the invention.

Referring to FIG. 7, a new data unit format that is extendable to future versions of the IEEE 802.11 communication protocol without further increasing the complexity of auto-detection at the receiver from that of the IEEE 802.11ax communication protocol is disclosed. The preamble of the new data unit format is future-proof, e.g., devices compliant with the EHT communication protocol and devices compliant with future version of the IEEE 802.11 communication protocol will not need to change the auto-detection state machine of the receiver and the auto-detection scheme is compatible with legacy versions of the IEEE 802.11 communication protocol. The new data unit format implements unified signaling for new versions of the communication protocol (i.e., 802.11be communication protocol and beyond). That is, the new data unit format facilitates auto-detection similar to IEEE 802.11ax communication protocol to classify a received data unit as being compliant with a newer version of the communication protocol. The preamble of the new data unit format includes new fields 604 (e.g., a universal field, U-SIG, and EHT-SIG) that are included in the preamble of data units compliant with new versions of the communication protocol to explicitly signal the version of the data unit format and other useful information. In at least one embodiment, the new data unit format includes an EHT-SIG field after the U-SIG field. In another embodiment, the new data unit format includes the U-SIG field but omits the EHT-SIG field. In at least one embodiment, the new data unit format includes range extension modulation in the U-SIG field and includes the EHT-SIG field after the U-SIG field. In at least one embodiment, the new data unit format includes range extension modulation in the U-SIG field and omits the EHT-SIG field.

New data unit format 600 coexists with legacy data unit formats up to IEEE 802.11ax by pre-appending legacy fields 602, e.g., L-STF, L-LTF, and L-SIG, duplicated over the entire signal bandwidth. In at least one embodiment, new data unit format 600 includes an RL-SIG field (i.e., a repeated L-SIG field) for range-extension, which allows reuse of an auto-detection state machine compliant with the IEEE 802.11ax communication protocol. In at least one embodiment, new data unit format 600 omits the RL-SIG field and the new auto-detection state machine is slightly modified from a legacy auto-detection state machine (e.g., compliant with IEEE 802.11ax communication protocol). The U-SIG field includes fixed symbols (e.g., two symbols) having fixed bit definitions, e.g., for the IEEE 802.11be communication protocol and other new versions of the IEEE 802.11 communication protocol. The U-SIG field encodes information for interoperability. The EHT-SIG field is similar to SIGB fields of IEEE 802.11ax data unit formats. The EHT-SIG field encodes information common to all users and encodes per-user information for decoding data for each corresponding user.

In at least one embodiment of new data unit format 600, the U-SIG field is one symbol, but in other embodiments, two symbols are used. Similar to the HE-SIGA field of IEEE 802.11ax communication protocol, the U-SIG field is a 20 MHz OFDM symbol that is duplicated across the entire bandwidth. Different cyclic redundancy check schemes can be adopted depending on the number of symbols and auto-detection requirements. In at least one embodiment of new data unit format 600, the U-SIG field signals the data unit format (e.g., three bits), Basic Service Set (BSS) colors (e.g., six bits), transmit opportunity (e.g., seven bits), spatial reuse (SR) (e.g., 4-16 bits), EHT-SIG field modulation, number of EHT SIG symbols, or other coexistence or new information.

In at least one embodiment of new data unit format 600, the U-SIG field includes common information for co-existence, power savings, data decoding, or other information. Information is also included in the EHT-SIG and U-SIG information bits for decoding the received data unit. In some embodiments, the U-SIG field is repeated for range extension or is used for range extension modulation (e.g., MCS0-DCM). In at least one embodiment of new data unit format 600, the EHT-SIG field signals other data-decoding related information (e.g., multi-user information, number of spatial streams, modulation type, or coding type). In at least one embodiment, new data unit format 600 omits the EHT-SIG field.

In at least one embodiment of new data unit format 600, since the U-SIG field includes coexistence bits, the EHT-SIG field signals the rest of common and per user information bits, e.g., number of spatial streams, bandwidth, modulation and coding schemes, coding, or packet extension (PE). In at least one embodiment of new data unit format 600, the EHT-SIG field is partitioned into the EHT-SIGA field for encoding information common to all users and the EHT-SIGB field for encoding information specific to each user. In at least one embodiment of new data unit format 600, the EHT-SIGA and EHT-SIGB fields are defined on a 20 MHz OFDM as HE-SIGA and duplicated across the entire bandwidth. In another embodiment, the EHT-SIGA and EHT-SIGB fields are defined on the entire bandwidth. In yet another embodiment of new data unit format 600, the EHT-SIGA field is defined on 20 MHz OFDM, similar to the HE-SIGA field and is duplicated across the entire bandwidth. The EHT-SIGB field is defined on the entire bandwidth or 40 MHz OFDM. In at least one embodiment, unlike legacy data unit formats, the EHT-SIG field has a unified format for both new data units for a single-user, new data units for multiple-users. The new data units for a single-user is a special case of the new data units for multiple-users.

In at least one embodiment of new data unit format 600, the EHT-SIG field uses a unified structure and is not further divided into SIGA, SIGB, and SIGC symbols. The EHT-SIG field includes all signaling bits (e.g., common bits and per-user bits) that are not included in the U-SIG and has the same structure for single-user and multi-user data units. Multiple user bits are concatenated together. In the single-user case, placeholder fields are used. In at least one embodiment of new data unit format 600, EHT-SIG bits are encoded and modulated together. The common bits are appended with tail bits and the CRC bits. Blocks of per-user bits are appended with tail bits and the CRC bits. Encoded common bits are followed by encoded per-user bits.

Figure 8:
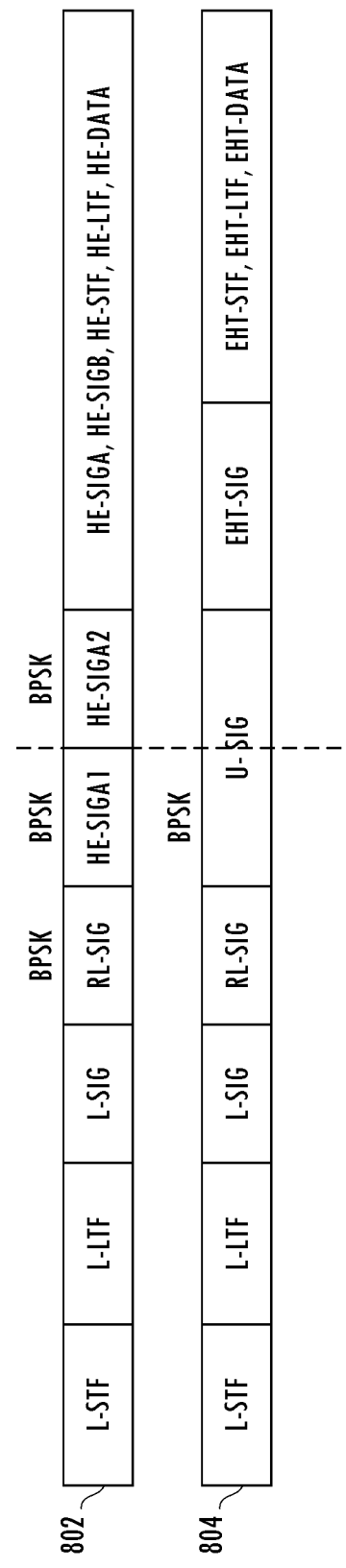
FIG. 8 illustrates diagrams of a data unit format of a legacy version of the communication protocol of FIG. 4 and a data unit format of a new version of the communication protocol of FIG. 7.

Referring to FIG. 8, in at least one embodiment of a new data unit format, new data unit format 804 includes an RL-SIG field that is similar to that in legacy data unit format 802. New data unit format 804 uses QBPSK modulation for the RL-SIG field, unlike legacy data unit format 802, which uses BPSK modulation of the RL-SIG field. In yet another embodiment, new data unit format 804 includes a signature sequence in the RL-SIG field, e.g., a flipped L-SIG bit sign, shuffled L-SIG bits, or a masked version of the L-SIG bits using a predetermined bit mask. In at least one embodiment, new data unit format 804 includes one U-SIG symbol. The one U-SIG symbol is modulated using BPSK or QBPSK and a new one-symbol 4-bit CRC is defined. In other embodiments, new data unit format 804 includes two U-SIG symbols. In at least one embodiment of new data unit format 804, the two U-SIG symbols use the same or different constellation rotations (e.g., the first and second symbols use BPSK and BPSK, BPSK and QBPSK, QBPSK and QBPSK, or QBPSK and BPSK, respectively). In embodiments of new data unit format 804 that use two U-SIG symbols, different two-symbol CRCs are defined for each symbol (e.g., the second symbol includes a flipped CRC sign, shuffled CRC order, or different CRC generation polynomial as compared to the first symbol).

Various signaling techniques may be used to detect a data unit format compliant with a new version of the communication protocol. In at least one embodiment, a single preamble pattern signals all new versions of the communication protocol. In at least one embodiment, stations compliant with a new version of the 802.11 communication protocol detect new data unit formats if the LENGTH subfield in the L-SIG field (or a combination of the LENGTH subfield in the L-SIG field combined with a LENGTH subfield of the RL-SIG field) modulo a predetermined number (e.g., 3) equals zero, the RL-SIG field is modulated using QBPSK, the RL-SIG field equals a predetermined pattern, and the U-SIG field is modulated using BPSK. In at least one embodiment, stations compliant with a new version of the 802.11 communication protocol detect new data unit formats if the LENGTH subfield in the L-SIG field (or a combination of the LENGTH subfield in the L-SIG field combined with a LENGTH subfield of the RL-SIG field) modulo a predetermined number does not equal zero, the RL-SIG field is a repeated version of the L-SIG field or equals a predetermined pattern, and the U-SIG field is modulated using BPSK. In at least one embodiment, stations compliant with a new version of the 802.11 communication protocol detect new data unit formats if the LENGTH subfield in the L-SIG field (or a combination of the LENGTH subfield in the L-SIG field combined with a LENGTH subfield of the RL-SIG field) modulo a predetermined number does not equal zero, the RL-SIG field is a repeated version of the L-SIG field or equals a predetermined pattern, and the U-SIG field is modulated using BPSK. In at least one embodiment, receivers compliant with a new version of the IEEE 802.11 communication protocol detect new data unit formats if the LENGTH subfield in the L-SIG field (or a combination of the LENGTH subfield in the L-SIG field combined with a LENGTH subfield of the RL-SIG field) modulo a predetermined number does not equal zero, the RL-SIG field is a repeated version of the L-SIG field or equals a predetermined pattern, and a CRC check of the U-SIG field. For example, the same RL-SIG field is used, and two U-SIG symbols are modulated using BPSK but have different CRC computations. Received data units compliant with the IEEE 802.11ac communications protocol will fail the CRC check. In another example, the same RL-SIG field is used, and two U-SIG symbols are modulated using BPSK but have the same CRC computation as the IEEE 802.11ax communication protocol. A receiver compliant with the IEEE 802.11ax communication protocol will pass the CRC check, but uses some of the information in the U-SIG field (e.g., BSS color for spatial reuse) to identify new versions.

In at least one embodiment, receivers compliant with a new version of the IEEE 802.11 communication protocol detect new data unit formats if the LENGTH subfield in the L-SIG field (or a combination of the LENGTH subfield in the L-SIG field combined with a LENGTH subfield of the RL-SIG field) modulo a predetermined number equals zero, the RL-SIG field is a repeated version of the L-SIG field or matches a predetermined pattern, the U-SIG field is modulated using BPSK, and the U-SIG field passes a CRC check. In at least one embodiment, stations compliant with a new version of the IEEE 802.11 communication protocol detect new data unit formats if the LENGTH subfield in the L-SIG field (or a combination of the LENGTH subfield in the L-SIG field combined with a LENGTH subfield of the RL-SIG field) modulo a predetermined number equals zero, the RL-SIG field is a repeated version of the L-SIG field, and the U-SIG field is modulated using BPSK. Other signaling techniques that may be used to detect a data unit compliant with a new version of the communication protocol use additional preamble patterns to signal the first two versions of the new versions of the communication protocol or each of the new versions of the communication protocol (e.g., the length subfield of the L-SIG field modulo a predetermined value (e.g., 3), at least one RL-SIG field pattern check, at least one RL-SIG field mask pattern, at least one U-SIG field CRC, multiple different CRC patterns in the U-SIG field, or combinations thereof).

Figure 9:
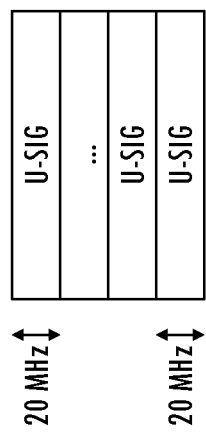
FIG. 9 illustrates a frequency mapping of a field of a data unit of the new version of the communication protocol of FIG. 7.
Figure 10:
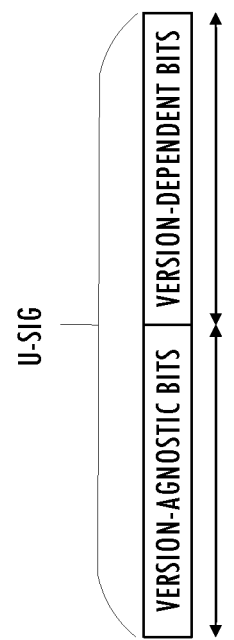
FIG. 10 illustrates sub-fields of a data unit format of the new version of the communication protocol of FIG. 7 consistent with at least one embodiment of the invention.

Referring to FIG. 9, in at least one embodiment of a new data unit format, the U-SIG field is defined for a 20 MHz bandwidth, similar to the HE-SIGA field of the IEEE 802.11ax communication protocol, and is duplicated over the entire data unit bandwidth. This embodiment increases resiliency to preamble puncturing by other users. The U-SIG field has two or more symbols with a predetermined number of total bits. Referring to FIG. 10, in at least one embodiment of the new data unit format, the U-SIG field includes two portions. A first portion includes version-agnostic bits that do not depend on a version of the communication protocol implemented in generating the new data unit. That is, those bits are consistent with a definition that is fixed for all new versions of the communication protocol. For example, the version-agnostic bits have a fixed number of bits and have a static bit definition for all versions after IEEE 802.11ax communication protocol. The version-agnostic field remains intact from generation to generation and are indifferent to the format of a new data unit. The version-agnostic field allows interfaces compliant with new versions of the communication protocol to interoperate with interfaces compliant with only a legacy version of the communication protocol. In at least one embodiment, the U-SIG field includes twenty version-agnostic bits: three bits for the data unit format (i.e., version identifier bits), six bits for BSS colors, seven bits for defining the starting time and maximum duration of a transmission opportunity (TXOP), and four Special Reuse (SR) bits. Additional bits can be defined or reserved for other MAC, coexistence, or common PHY bits.

In at least one embodiment of the new data unit format, the second portion of the U-SIG field includes version-dependent bits that have a definition that varies with the version of the communication protocol. For example, each new version of the communication protocol has a different bit definition and includes bits for decoding the new data unit. In at least one embodiment, the U-SIG field includes bits indicating the number of EHT-SIG symbols, the modulation and coding scheme of the EHT-SIG symbols, data bandwidth, modulation and coding scheme of the data portion of the data unit (e.g., EHT-DATA), or other information.

Figure 11:
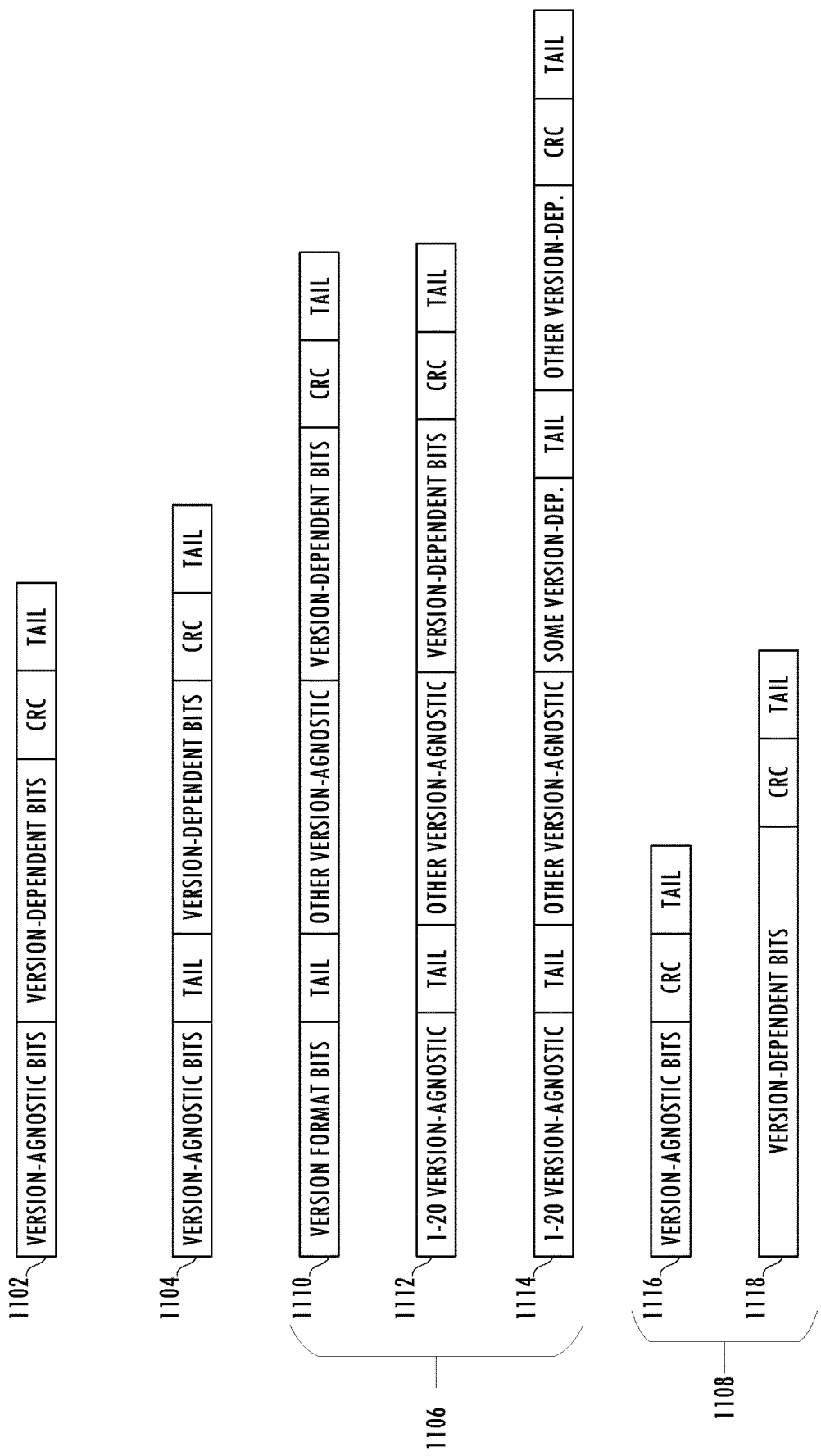
FIG. 11 illustrates various encoding schemes for the sub-fields of the data unit format of FIG. 10 consistent with various embodiments of the invention.

Referring to FIG. 11, various embodiments of the new data unit format implement different encoding schemes for the U-SIG field. For example, encoding scheme 1102 prepends the version-agnostic bits to the version-dependent bits, adds CRC bits and tail bits after the version-dependent bits, and jointly encodes the version-agnostic bits and the version-dependent bits, e.g., using BPSK modulation and BCC-1/2 encoding. Other embodiments of encoding schemes for the U-SIG field (e.g., encoding schemes 1104, 1110, 1112, 1114, and 1108) provide options for early decoding. For example, encoding scheme 1104 separately encodes the version-agnostic bits and the version-dependent bits. Tail bits are added after the version-agnostic bits and CRC bits and tail bits are added after the version-dependent bits. This encoding scheme allows version-agnostic bits to be decoded earlier than for encoding scheme 1102, which may simplify the receiver state machine in embodiments that use multiple symbols for the U-SIG field, e.g., by recovering the version format bits earlier that other bits.

Encoding schemes 1106 separately encode bits that the receiver state machine decodes earlier than other bits. Encoding scheme 1110 adds tail bits after version format bits, but before other version-agnostic bits. The other version-agnostic bits and version-dependent bits are encoded with CRC bits and tail bits. Encoding scheme 1112 adds tail bits at the end of a first OFDM symbol of version-agnostic bits (e.g., six tail bits are added after the $20^{th}$ version-agnostic bit for BPSK and ½ rate convolutional encoding). CRC bits and tail bits are added after the other version-agnostic bits and the version-dependent bits. For multiple symbols, encoding scheme 1114 adds tail bits at the end of each OFDM symbol (e.g., six tail bits after each set of 20 bits for BPSK and ½ rate convolutional encoding). Encoding scheme 1108 partitions the U-SIG field into separately encoded OFDM symbols, e.g., OFDM symbol 1116 for the version-agnostic bits and OFDM symbol 1118 for the version-dependent bits. CRC bits and tail bits are added after the version-agnostic bits and the CRC and tail bits are added after the version-dependent bits.

Figure 12:
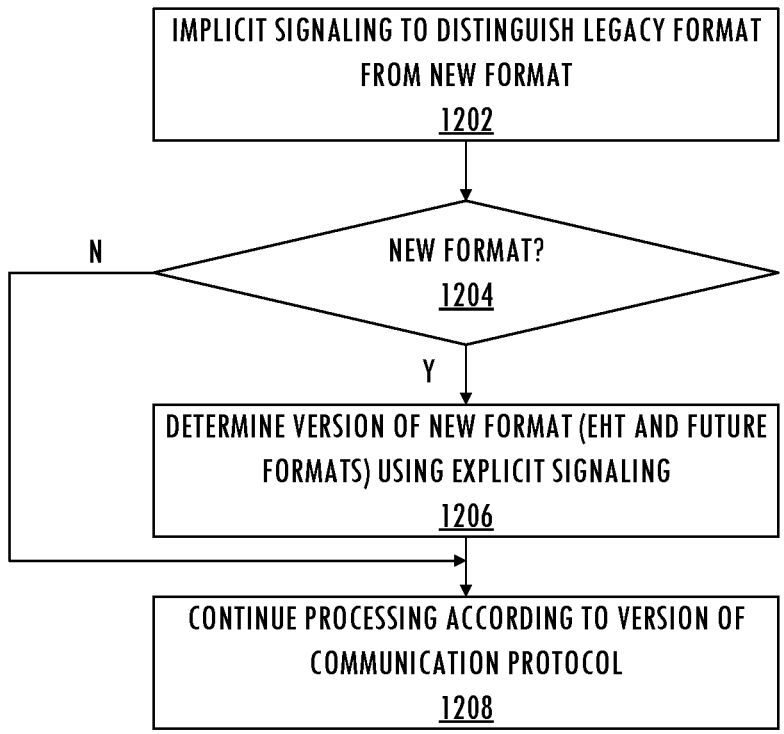
FIG. 12 illustrates an information and control flow for signaling a version of a communication protocol used to generate a received data unit consistent with at least one embodiment of the invention.

Referring to FIG. 12, in at least one embodiment of a communications network compliant with a new version of a communication protocol (e.g., the IEEE 802.11 communication protocol), a unified format signaling technique that includes implicit signaling (e.g., based on type of modulation or field repetition) and explicit signaling. The receiver selectively decodes a portion of the received data unit to distinguish between new versions of the communication protocol based on the implicit signaling. For example, the receiver distinguishes between a received data unit compliant with a legacy format of the communication protocol from a received data unit compliant with a new format of the communication protocol using implicit signaling (1202). If the receiver determines that the data unit has a new format compliant with a new version of the communication protocol (1204), then the receiver explicitly decodes a portion of the received data unit to distinguish between new versions of the communication protocol (1206). In at least one embodiment, the receiver decodes bits of the U-SIG field to determine which version of the new communication protocols was used to generate the data unit (e.g., if the received data unit is an EHT data unit). If the received data unit has a legacy format (1204), then the implicit decoding alone determines which legacy version of the communication protocol was used to generate the data unit. After determining the version of the data unit format, the receiver continues to process the received data unit according to the version of the communication protocol (1208).

In at least one embodiment, a method for operating a communications network includes encoding a first field of a preamble of a data unit and implicitly encoding a portion of the preamble to identify the data unit as being compliant with future versions of a communication protocol as distinguished from legacy versions of the communication protocol. The first field includes first bits having a static definition that is fixed for the future versions of the communication protocol and second bits having a definition that varies with each new version of the future versions of the communication protocol. The first bits may have a predetermined location and predetermined bit definitions. The first bits may include version identifier bits, basic service set identifier bits, and transmission opportunity bits. The second bits may include information corresponding to data bandwidth information of communications using the communications network. The second bits may indicate a number of symbols in a next adjacent field of the preamble, a modulation of the next adjacent field, and a coding type of the next adjacent field. The first bits of the first field and the second bits of the first field may be modulated using binary phase-shift keying and may be jointly encoded with cyclic redundancy check bits and at least one tail bit. The implicitly encoding may include modulating the first field using binary phase-shift keying, the first field being adjacent to a second field. The second field may be a repeated version of a third field. The implicitly encoding may include encoding the third field and the second field in the portion of the preamble. A modulo operation of a length subfield in the second field or a length based on a combination of the length subfield in the second field and another length subfield in the third field and a predetermined value may be equal to zero and the second field may be equal to the third field. The method may further include encoding a second field adjacent to the first field, the second field including common information for communications with a single user or for communications with multiple users and per-user information for decoding data for the single user or for each user of the multiple users. The method may further include encoding a second field including information indicating a number of spatial streams, a modulation type, and a coding type.

In at least one embodiment, a communications network includes a transmitter. The transmitter includes an encoder configured to encode a first field of a preamble of a data unit. The transmitter is configured to implicitly encode a portion of the preamble to identify the data unit as being compliant with future versions of a communication protocol as distinguished from legacy versions of the communication protocol. The first field includes first bits having a static definition that is fixed for the future versions of the communication protocol and second bits having a variable definition that varies with each new version of the future versions of the communication protocol. The portion may include a second field having a length subfield. A modulo operation of the length subfield and three may equal to zero. The transmitter may further include a circuit configured to duplicate a second field in a third field of the preamble. The third field may be adjacent to the second field. The transmitter may further include a constellation mapper configured to modulate a fourth field of the preamble, using binary phase-shift keying modulation, the fourth field being adjacent to the third field. The first bits may have a predetermined location and predetermined bit definitions. The communications network may further include a receiver including a decoder configured to implicitly decode a received preamble of a received data unit to determine whether the received data unit is compliant with a legacy version of the communication protocol or the future versions of the communication protocol. The decoder may be further configured to selectively decode the data unit to determine a version of the future versions of the communication protocol used to encode the data unit based on whether the data unit is determined to be compliant with the future versions of the communication protocol. The decoder may be further configured to use the same decode sequence for decoding a first data unit for a single-user as for decoding a second data unit for multiple users for the future versions of the communication protocol.

In at least one embodiment, a method for operating a communications network includes receiving a data unit and implicitly decoding a portion of the data unit to determine whether the data unit is compliant with a legacy version of a communication protocol or is compliant with future versions of the communication protocol. The method further includes selectively decoding the data unit to determine a version of the communication protocol used to encode the data unit based on whether the data unit is compliant with the legacy version of the communication protocol or is compliant with the future versions of the communication protocol. The implicitly decoding may include decoding a first field of a preamble of the data unit and determining whether the data unit is compliant with a first communication protocol based on a comparison of the first field to a second field adjacent to the first field, a determination of whether a modulo operation on a length subfield and a predetermined value equals zero, the length subfield being decoded from the first field or decoded from a length subfield in the first field combined with another length subfield in the second field, and a determination of a type of modulation of a third field. The first field may be equal to the second field, the length subfield may be modulo three, and the type of modulation of the third field may be binary phase-shift keying, and the data unit may be determined to comply with the first communication protocol. Selectively decoding may include decoding the third field to determine the version of the communication protocol, a format of the data unit, basic service set identifier, and transmission opportunity. Selectively decoding may include decoding a fourth field adjacent to the third field to determine common information and per-user information for at least one user. Selectively decoding may include using the same decode sequence for decoding a first data unit for a single-user and for decoding a second data unit for multiple users.

Thus, techniques for signaling new versions of a communication protocol differentiated from legacy versions of the communication protocol that are interoperable with stations implementing legacy versions of the communication protocol, that are compatible with future new versions of the communication protocol, and that do not overly complicate the receiver state machine have been disclosed.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

Although the invention is described herein with reference to specific embodiments, various modifications and changes can be made without departing from the scope of the present invention as set forth in the claims below. For example, while the structured-pipelined CORDIC techniques are described with reference to IEEE 802.11 communication protocol, techniques described herein can be adapted to other communication protocols. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for operating a communications network comprising:
    encoding a first field of a preamble of a data unit; and
    implicitly encoding a portion of the preamble to identify the data unit as being compliant with future versions of a communication protocol as distinguished from legacy versions of the communication protocol;
    wherein the first field includes first bits having a static definition that is fixed for the future versions of the communication protocol, and second bits having a definition that varies with each new version of the future versions of the communication protocol; and
    wherein the second bits indicate a number of symbols in a next adjacent field of the preamble, a modulation of the next adjacent field, and a coding type of the next adjacent field.

2. The method, as recited in claim 1, wherein the first bits have a predetermined location and predetermined bit definitions.

3. The method, as recited in claim 1,
    wherein the first bits include version identifier bits, basic service set identifier bits, and transmission opportunity bits, and
    wherein the second bits include information corresponding to data bandwidth information of communications using the communications network.

4. The method, as recited in claim 1, wherein the first bits of the first field and the second bits of the first field are modulated using binary phase-shift keying and are jointly encoded with cyclic redundancy check bits and at least one tail bit.

5. The method, as recited in claim 1, wherein the implicitly encoding comprises:
    modulating the first field using binary phase-shift keying, the first field being adjacent to a second field, the second field being a repeated version of a third field; and
    encoding the third field and the second field in the portion of the preamble, a modulo operation of a length subfield in the second field or a length based on a combination of the length subfield in the second field and another length subfield in the third field, and a predetermined value being equal to zero, and the second field being equal to the third field.

6. The method, as recited in claim 1, further comprising:
    encoding a second field adjacent to the first field, the second field including common information for communications with a single user or for communications with multiple users and per-user information for decoding data for the single user or for each user of the multiple users.

7. The method, as recited in claim 1, further comprising:
    encoding a second field including information indicating a number of spatial streams, a modulation type, and a coding type.

8. The method, as recited in claim 1,
    wherein the first field follows a legacy signal field (L-SIG) and any repeated legacy signal field (RL-SIG) within the preamble,
    wherein the first field is prior to an extra-high throughput signal field (EHT-SIG) within the preamble, and
    wherein the L-SIG, any RL-SIG, and the first field are duplicated over an entire signal bandwidth.

9. A communications network comprising:
    a transmitter comprising:
    an encoder configured to encode a first field of a preamble of a data unit,
    wherein the transmitter is configured to implicitly encode a portion of the preamble to identify the data unit as being compliant with future versions of a communication protocol as distinguished from legacy versions of the communication protocol;
    wherein the first field includes first bits having a static definition that is fixed for the future versions of the communication protocol, and second bits having a variable definition that varies with each new version of the future versions of the communication protocol; and
    wherein the second bits indicate a number of symbols in a next adjacent field of the preamble, a modulation of the next adjacent field, and a coding type of the next adjacent field.

10. The communications network, as recited in claim 9, wherein the portion includes a second field having a length subfield, a modulo operation of the length subfield and three being equal to zero.

11. The communications network, as recited in claim 9, wherein the transmitter further comprises:
    a circuit configured to duplicate a second field in a third field of the preamble, the third field being adjacent to the second field; and
    a constellation mapper configured to modulate a fourth field of the preamble, using binary phase-shift keying modulation, the fourth field being adjacent to the third field.

12. The communications network, as recited in claim 9, wherein the first bits have a predetermined location and predetermined bit definitions.

13. The communications network, as recited in claim 9, further comprising:
    a receiver comprising:
    a decoder configured to implicitly decode a received preamble of a received data unit to determine whether the received data unit is compliant with a legacy version of the communication protocol or the future versions of the communication protocol, and the decoder being further configured to selectively decode the data unit to determine a version of the future versions of the communication protocol used to encode the data unit based on whether the data unit is determined to be compliant with the future versions of the communication protocol.

14. The communications network, as recited in claim 13, wherein the decoder is further configured to use the same decode sequence for decoding a first data unit for a single-user as for decoding a second data unit for multiple users for the future versions of the communication protocol.

15. A method for operating a communications network comprising:
   receiving a data unit;
   implicitly decoding a portion of the data unit to determine whether the data unit is compliant with a legacy version of a communication protocol or is compliant with future versions of the communication protocol; and
   selectively decoding the data unit to determine a version of the communication protocol used to encode the data unit based on whether the data unit is compliant with the legacy version of the communication protocol or is compliant with the future versions of the communication protocol,
   wherein the implicitly decoding comprises:
   decoding a first field of a preamble of the data unit; and
   determining whether the data unit is compliant with a first communication protocol based on a comparison of the first field to a second field adjacent to the first field, a determination of whether a modulo operation on a length subfield and a predetermined value equals zero, the length subfield being decoded from the first field or decoded from the length subfield in the first field and another length subfield in the second field, and a determination of a type of modulation of a third field.

16. The method, as recited in claim 15, wherein the first field equals the second field, the length subfield is modulo three, the type of modulation of the third field is binary phase-shift keying, and the data unit is determined to comply with the first communication protocol.

17. The method, as recited in claim 15, wherein selectively decoding includes decoding the third field to determine the version of the communication protocol, a format of the data unit, basic service set identifier, and transmission opportunity.

18. The method, as recited in claim 15, wherein selectively decoding includes decoding a fourth field adjacent to the third field to determine common information and per-user information for at least one user.

19. The method, as recited in claim 15, wherein selectively decoding includes using the same decode sequence for decoding a first data unit for a single-user and for decoding a second data unit for multiple users.

20. A communications network comprising:
   a transmitter comprising:
   an encoder configured to encode a first field of a preamble of a data unit,
   wherein the transmitter is configured to implicitly encode a portion of the preamble to identify the data unit as being compliant with future versions of a communication protocol as distinguished from legacy versions of the communication protocol;
   wherein the first field includes first bits having a static definition that is fixed for the future versions of the communication protocol, and second bits having a variable definition that varies with each new version of the future versions of the communication protocol;
   wherein the first field follows a legacy signal field (L-SIG) and any repeated legacy signal field (RL-SIG) within the preamble,
   wherein the first field is prior to an extra-high throughput signal field (EHT-SIG) within the preamble, and
   wherein the L-SIG, any RL-SIG, and the first field are duplicated over an entire signal bandwidth.

* * * * *